(12) United States Patent
Belniak et al.

(10) Patent No.: US 7,379,926 B1
(45) Date of Patent: May 27, 2008

(54) DATA MANIPULATION AND DECISION PROCESSING

(75) Inventors: MacGregor Belniak, Evanston, IL (US); Jorge Moraleda, Menlo Park, CA (US)

(73) Assignee: Remington Partners, Kentfield, CA (US)

( * ) Notice: Subject to any disclaimer, the term of this patent is extended or adjusted under 35 U.S.C. 154(b) by 751 days.

(21) Appl. No.: 10/074,958

(22) Filed: Feb. 11, 2002

Related U.S. Application Data

(60) Provisional application No. 60/267,610, filed on Feb. 9, 2001, now abandoned.

(51) Int. Cl.
G06F 17/00 (2006.01)
G06N 5/02 (2006.01)
(52) U.S. Cl. .............................. 706/46; 706/12; 706/14
(58) Field of Classification Search .................. 706/46, 706/12, 14; 717/102
See application file for complete search history.

(56) References Cited

U.S. PATENT DOCUMENTS

| | | | |
|---|---|---|---|
| 5,850,470 A * | 12/1998 | Kung et al. ................. 382/157 |
| 5,881,301 A * | 3/1999 | Robbins ........................ 712/1 |
| 6,601,233 B1 * | 7/2003 | Underwood ................ 717/102 |
| 6,615,199 B1 * | 9/2003 | Bowman-Amuah .......... 706/50 |
| 2001/0032029 A1 * | 10/2001 | Kauffman ..................... 700/99 |
| 2003/0058277 A1 * | 3/2003 | Bowman-Amuah ......... 345/765 |

OTHER PUBLICATIONS

David Heckerman, A Tutorial on Learning With Bayesian Networks, Mar. 1995, Microsoft, Revised Nov. 1996, 1-57.*
Yoav Freund et al., The alternating decision tree learning algorithm, 1999, AT&T.*
Dragos D. Margineantu et al., Pruning Adaptive Boosting, 1997, Oregon State University.*
Freund, Yoav, et al., "The Alternating Decision Tree Learning Algorithm," In Machine Learning: Proceedings of the Sixteenth International Conference, 1999, pp. 124-133.

* cited by examiner

*Primary Examiner*—Joseph P Hirl
(74) *Attorney, Agent, or Firm*—Blakely, Sokoloff, Taylor & Zafman LLP

(57) ABSTRACT

A device for making automated transaction decisions comprising a memory to store a series of historical records and results, where each record contains a set of data values for a corresponding set of variables, a transaction input unit to convey corresponding data values of a transaction for which a decision is to be made, a decision output unit to convey a recommended decision, a self-configuring modeler to configure itself based upon information stored in memory in order to predict expected results from any set of data values, and a controller coupled to the modeler and the transaction input unit to generate a decision output.

12 Claims, 3 Drawing Sheets

---

Data Mining

Make statistical summaries from raw data

"72% of women age 30-35 buy new cars, and their incomes are between $50k and $100k."

Data Visualization

Turn statistical summaries and raw data into pictures

Data Inference

Turn raw data and statistical summaries in to action-ready information

List

"Mail promotion to these people. Expect a 28% yield: $50 avg. vs. 11% yield: $45 avg, industry standard."

Data Mining

Make statistical summaries from raw data

"72% of women age 30-35 buy new cars, and their incomes are between $50k and $100k."

Data Visualization

Turn statistical summaries and raw data into pictures

Data Inference

Turn raw data and statistical summaries into action-ready information

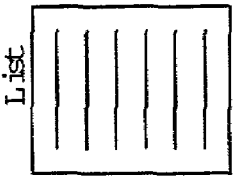

List

"Mail promotion to these people. Expect a 28% yield: $50 avg. vs. 11% yield: $45 avg. industry standard."

Figure 1

DATA MANIPULATION AND DECISION PROCESSING

This application claims the benefit of the filing date of U.S. Provisional Patent No. 60/267,610, filed on Feb. 9, 2001 now abandoned.

FIELD OF THE INVENTION

The present invention relates to the field of automated decision making; more particularly, the present invention relates to automated decision making for transactions.

BACKGROUND OF THE INVENTION

Human Decision Makers

Traditionally, the way decisions have been made has been to have a human expert assess the situation based upon their past experience and to make a judgment. This judgment then leads to an action which is described as a decision.

An advantage of this approach is that there already exist a number of experts who can be contracted to perform assessments—there is no need to create a new decision system. However, this advantage is counter balanced by several disadvantages—such experts may not exist in sufficient quantity and quality, may not be readily available when needed (24×7), may not be able to process information quickly enough, and may not make good decisions in situations where there are multiple uncertainties that interact in complex ways to affect the outcome of the situation.

To address the availability, repeatability, and uncertainty problems, computer-based decisions systems have been envisioned that would make decisions in lieu of experts, though perhaps with their input in building the decision system.

Expert Systems

Principal approaches to automating such decisions have been referred to as Artificial Intelligence, Expert Systems or Rule Based Systems. These systems consist of a number of conditional propositions (if X then Y or if X then Y with probability P) that compose a database of rules. When a transaction arrives, the values of its variables are then compared to the conditional propositions to reason to a likely outcome. Once an end state has been reasoned to, the system recommends a decision based upon that reasoning.

If a good rule base is in place, an automated decision can be made even at times when no human expert is available, and if the rules are superior to the judgment of a single individual it is possible that even better results will result— in any case a rule based system will have consistently repeatable results. For this system to be successful, it must have a good rules database. The process of deriving a rules database is usually called knowledge engineering. In this process, an expert in the creation of rules (called the knowledge engineer) is paired with a domain expert. The knowledge engineer then interviews the domain expert and tries to derive a set of rules.

In practice, this knowledge engineering process is often not very successful. Not only does it require access to a domain expert and to a knowledge engineer, but also it requires the domain expert to be articulate about the domain in terms that are meaningful to the knowledge engineer, and the knowledge engineer to be skillful at learning about the domain. Often this is not the case. Many experts are good at making judgments about situations but poor about explaining why they make those judgments. Because knowledge engineers themselves are not domain experts, they often encode rules specified by the experts, but the rules turn out to be overly simplistic.

A particularly frequent problem is that experts often explain their judgments after the fact by reference to obvious correlations between variables. For instance, an insurance products expert may observe that all the purchasers of maternity care insurance are women, and the knowledge engineer might encode this in an expert system as if gender=female then interest-in-maternity-care-insurance=high with probability P. A problem is that while gender has a high correlation with maternity care, it isn't a good discriminator. That is, while all people interested in maternity care insurance may be female, there may be many more females who are not interested in the insurance than who are. A better discriminator measure might include age, marital status, or enrollment in a Lamaze class. Quite often experts do not consciously recognize or cannot articulate these good discriminators, and the resulting automated models are often not very fast, and they are not very accurate.

Data-Derived Models

An alternative to the expert systems approach is to dispense with the expert and derive models directly from the data itself. In effect, this is equivalent to what the expert does when they build up experience over time—except that the automated system can build its expertise over far more transactions, and an automated system is capable of more reliable memory and more precise assessments of the degrees of correlation and discrimination among the variables. Therefore, in theory, data-derived models can be more accurate in their predictions than human experts are.

In practice, exhaustively determining all the cross-correlations can be computationally infeasible. Therefore a number of methods have been developed to "guess" at potential models, and apply heuristics to optimize them until they result in a sufficiently good, but probably suboptimal solution. Among these approaches are neural networks and genetic algorithms, as well as Bayesian networks. Some of these heuristic methods (but not including Bayesian networks) is that they generate "black-box" models. That is, it is fundamentally impossible to see what they have "learned", or "why" they are producing certain recommendations.

SUMMARY OF THE INVENTION

A device for making automated transaction decisions comprising a memory to store a series of historical records and results, where each record contains a set of data values for a corresponding set of variables, a transaction input unit to convey corresponding data values of a transaction for which a decision is to be made, a decision output unit to convey a recommended decision, a self-configuring modeler to configure itself based upon information stored in memory in order to predict expected results from any set of data values, and a controller coupled to the modeler and the transaction input unit to generate a decision output.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 illustrates turning raw data and statistical summaries into action ready information.

DETAILED DESCRIPTION OF THE PRESENT INVENTION

Figure 2:
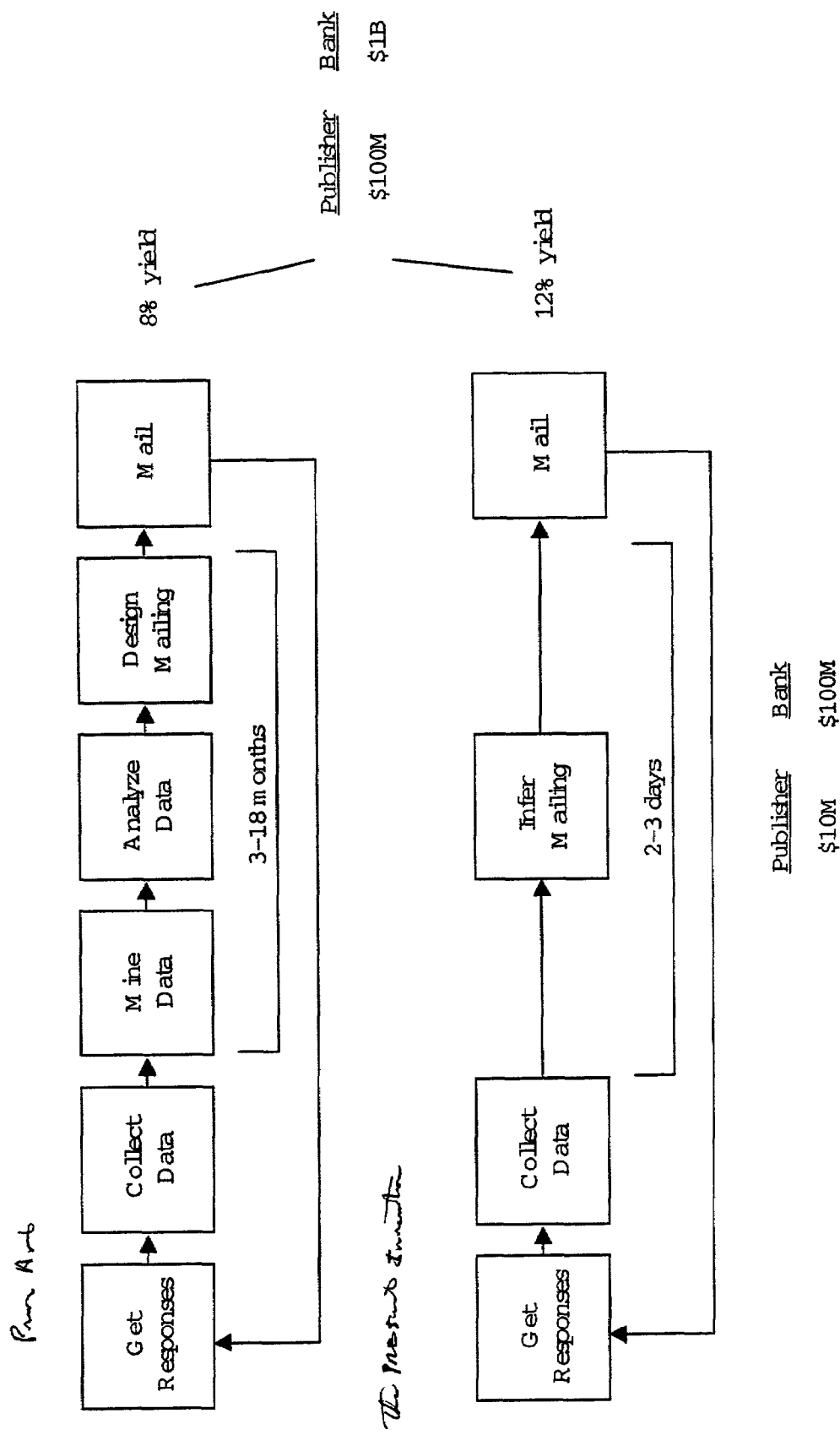
FIG. 2 illustrates the distinction between traditional processing which responses are received, data is collected, and then mined and the present invention.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

A method and apparatus for performing advanced analyses of data is described. These software technologies enable the creation of products that address problems in the fields of data mining, realtime learning, and automated decision making processes. The quality, performance and scaling characteristics of such products are of a nature that without our software technology or another similar (currently non-existent) technology has been considered computationally infeasible. The initial configuration of these component technologies into an automated decision process is also described below.

Applications of the technology described herein include, but are not limited to, financial services, e-commerce, advertising, network management, bioinformatics, and genomics, among other industries. Some examples of specific solution applications include identification of and decision-making for: customer retention, customer acquisition, fraud detection, fault diagnosis, pattern recognition, population segmentation, routing of information, and individualized personalization of offers, advertisements, webpages, or interactions.

The techniques described herein are applicable to making business-related decisions. For a given business decision a model is created that has two components: (1) a business model that describes the alternatives available for the decisions and values associated with the potential outcomes; and (2) a model of the relationships between the uncertainties or variables of concern.

The software technology automatically learns the relationships among the uncertainties, based on data from previous cases. The software searches through possible models of the relationships using algorithms that provide a speed of response far in excess of known methods.

Once a model is created it can be intuitively represented and explored to understand the inherent relationships learned from the data. New variables can be created from existing data to better inform subsequent versions of the model. Experts have the ability to guide this process and modify the discovered relationships if they so desire. This ability to understand the key drivers of the model and investigate the multi-dependent relationships generates immediate business insights. It can also be used to determine the effect on the value of a decision of gathering additional information about the case before making decisions. In one embodiment, software code and a user interface facilitate this type of analysis.

Once a model is created, it can be used to make decisions automatically for new cases. (A case consists of knowledge of the values of some sub-set of the variables.) Using the present invention, decision-making is automated to respond to incoming data with realtime speed and update the model to incorporate new results.

An example can help illustrate this: consider a bank that has a set of databases representing past customer interactions in the form of transaction records. Assuming that these transactions include records of bank initiated customer contacts (e.g., marketing and sales efforts), and customer transactions including records for closing of accounts. A key concern for bank executives might be to identify which customers are most likely to leave the bank (or drop a banking product) in the immediate future. Additionally, the bank would like to know which of many actions it could take are most likely to result in retaining these at-risk customers and what information can be gathered about each customer to best inform this decision. Ultimately, if the bank knew which were the customers at risk and the best action to take to retain the at-risk customer, the decisions to implement these actions could be automated. In one embodiment, the present invention may be used to determine both which customers are most at risk, show the bank what variables are most important in predicting who is at risk, and for any specific given customer, which offer is most likely to achieve success in changing their propensity to leave into a propensity to stay.

An Exemplary Process

The present invention provides a process that involves data mining, data visualization and data inference. The process initially starts with making statistical summaries from raw data using data mining. These statistical summaries and raw data are turned into graphical illustrations for purposes of visualizing the data. The raw data and statistical summaries are also turned into action-ready information. An example of that is shown in FIG. 1.

FIG. 2 illustrates the distinction between traditional processing which responses are received, data is collected, and then nined and the process of the present invention. Based on the results of mining the data, the data may be analyzed and may be processed such as by creating a mailing which is subsequently mailed. One embodiment of the present invention shows that in the same manner as the prior art, responses are received and data is collected. However, it is different than the prior art in that the data inference that is generated can be used to infer an action or list of actions such as, for example, sending a mailing. The difference in the process can make processes that take months turn into processes that take days.

Figure 3:
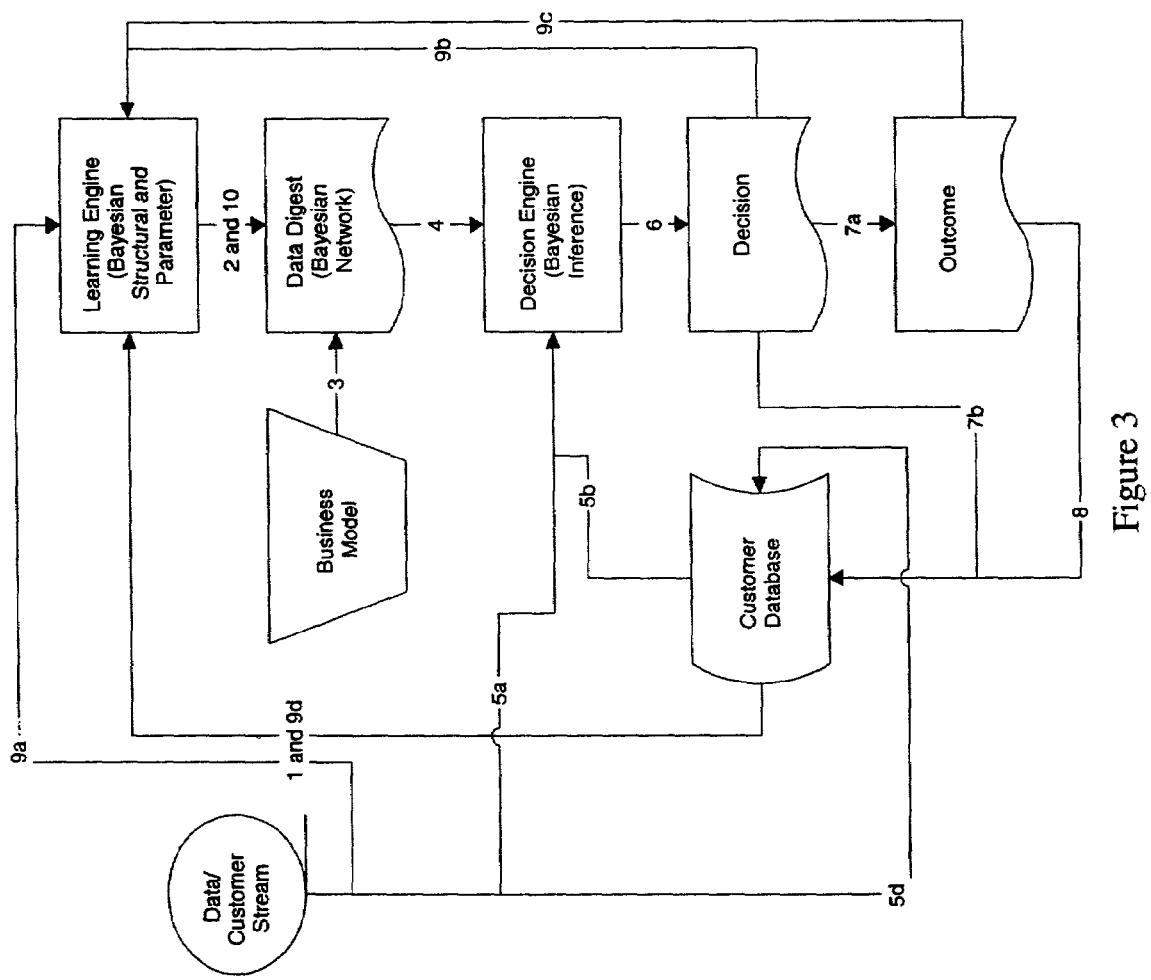
FIG. 3 illustrates a flow diagram of a decision making process.

A goal of one embodiment of the process is to enable organizations that are inundated in data and data streams to leverage the knowledge contained in their data and data streams to automatically make repetitive decisions. The following sequence is described in conjunction with FIG. 3. These operations are performed by processing logic that my comprise hardware (e.g, circuitry, dedicated logic, etc.), software (such as is run on a general purpose computer system or a dedicated machine), or a combination of both.

1. A subset of customer database is linked to a learning engine.

2. The learning engine uses the customer database to learn qualitatively which variables have the possibility of being related and quantitatively how these variables are related. This knowledge is encoded into a data digest 3. Along with a business model is a description of the decision that will be made automatically.

4. The current data digest is exported to a decision engine for use in automatic decision-making.

5. When a decision is required, everything that is known about the customer (values for variables in the digest) is passed into the decision engine. This includes data that the customer is submitting, 5a. It may also include data from the customers previous sessions, if any, 5b.

6. The decision engine then uses the data digest and the information about the customer to make one or more decisions.

7. An action is taken based on the decision, 7a, the decision is possibly recorded into the customer database, 7b.

8. There is then an outcome associated with the decision that may be stored in the customer database. For example, Decision: the engine decides to extend a line of credit. Action: credit is extended. Outcome: the customer defaults $5K.

9. The new data that the customer is submitting is sent to the learning engine, 9a. The decision is sent to the learning engine, 9b. The outcome associated with the decision that is passed to the learning engine, 9c. The customers record may also be sent to the learning engine, 9d.

10. The learning engine updates the qualitative and quantitative aspects of the data digest to reflect the currently available information using only the information given in 9, not the entire customer database.

Variables can be added or removed from consideration and the business model can be modified via 3 without repeating 2.

Various algorithms and approaches for each of the operations mentioned are well-known in the art.

Bayesian Network Analysis

An approach employed by the technique described herein is called Bayesian Network Analysis, and it generates data-derived models that have the distinct advantage that the user can see the "why" of recommendations. The basic Bayesian approach starts with a model of correlations between variables. With each observation the probability of the correlations that are observed increases and the probability of correlations that are not observed are decremented. Over many transactions a very good predictive model that can account for the data received so far may be created.

A practical problem with the Bayesian approach is its computational difficulty. The number of correlations to be calculated is very large as the number of records and variables in the database increases.

In one embodiment, the present invention provides software applications that use automated scalable learning of Bayesian Networks for business decision making.

By Industry

The technology described herein has application in the following industries (not an exhaustive list):
Financial Decision Making:
  Loan Processing/Credit Granting
  Fraudulent transaction detection
  Market predictions
  Portfolio decisions
  Illegal transaction detection (aka "Know your Customer" government required surveillance program)
CRM systems
  Customer Acquisition strategies
  Customer Retention strategies
  Product/Customer targeting
  Personalization of products, communications, and interactions
Advertising
  Collaborative Filtering
  Targeted merchandizing
Computer UI Customization
Network Management
  Packet switching and transmission routing
  Fault diagnosis, test recommendation, and automatic re-routing
  Detection and prevention of denial of service attacks
Bioinformatics/Genomics/Pharmaceuticals
  Pattern recognition for identifying promising sequences in DNA or other molecules
  Screening of possible candidate molecules or compounds for certain properties
  Prediction of results and/or interactions of molecules or compounds in organisms The general applications (although not exhaustive) may be:
Diagnosis
Prediction
Routing
Targeting
Customization and Personalization
Search
Pattern Recognition
Risk Analysis By Device Architecture The process uses a physical architecture to support it. Specifically, in one embodiment, the process is implemented in software and works on computer and microprocessor based systems.

The present invention provides the following:

1. A device for making automated transaction decisions comprising:
  a. a memory which is able to store a series of historical records and their results in said memory, where each record contains a set of data values for a corresponding set of variables,
  b. a transaction input means for conveying corresponding data values of the transaction for which a decision is to be made,
  c. a decision output means for conveying the recommended decision,
  d. a modeler which is able to configure itself based upon the contents of said memory in order to predict expected results from any set of data values,
  e. a controller which when given said modeler and said transaction input generates said decision output.

2. The device in claim 1 further including an output means for conveying the probability or expected value of the expected result given said decision.

3. The device in claim 1 further including an output means for conveying the model produced by said modeler.

4. The device in claim 1 in which the memory of historical records is not present, but is replaced by a previously configured modeler.

5. The device in claim 1 in which the model is continuously updated with each transaction.

6. The device in claim 5 in which the modeler is able to configure itself to recommend an optimal solution in a reduced time period.

7. A method for analyzing and representing data in a computer system, comprising:
  a. determining the statistical probabilities of each combination of data values
  b. applying said statistical probabilities to determine an optimal predictive model c. applying a transaction consisting of a new set of data values to such predictive model in order to yield an expected set of probabilities for the results of each possible decision d. presenting the representation to a control mechanism or individual capable of enacting decisions based on the knowledge represented.

e. implementation of any or all of the claims 1 thru 6 in a computer system 8. The method in claim 1 further including means to convey the probability or expected value of said decision.

9. The method in claim 1 further including means to convey the model produced by said modeler.

10. The method in claim 1 where the predictive model is adjusted based upon each transaction and result.

11. The method in claim 1 where the predictive model is created more expeditiously.

Detailed Description of Selected Components

A Bayes Net is a graphical representation of a joint probability distribution decomposition. Creation and computation of Bayes Nets are at the core of the software and other techniques and thus very fast implementation on many Bayes Net operations have been developed.

Core Technology

Clustering

Clustering is a process by which a database is compressed by aggregating similar records together and adding a frequency of occurrence measure. This provides significant storage savings and speed improvements with minor or null degradation in accuracy. Note that in one embodiment, this is very different from the traditional classification approach to clustering in which the goal is to classify records into a handful of clusters. By having highly efficient clustering algorithms based on multiple hashing achieves a significantly subquadratic operation time which enables clustering of much larger data sets than traditional clustering algorithms might achieve, thus improving the scalability of the software.

RAM Database

The RAM database is used to store the data in the process of learning a Bayes Net from data. When trying to determine the optimal structures and parameters, information contained in the tree many times may be requested many times. If this information were not in main (RAM) memory, disk access times would greatly lengthen the calculation times. In one embodiment, the RAM database technologies allows storage these intermediate results for reuse, thus speeding up access by 2 orders of magnitude.

Missing Values Handling

The software can make usage of data for learning even in the presence of missing values. Various processes have been implemented that provide various trade offs between speed and accuracy. Moreover sophisticated heuristics are in place that enable dynamic choice of missing value processing mechanism as well as combinations of them thus achieving a high level of accuracy and speed simultaneously. Among the various mechanisms for dealing with missing values are:

Truncation, discards the record only in those queries involving variables with missing values Bound and Collapse, predicts the missing values using (cite Sebastiani and Ramoni)

EM, standard expectation maximization algorithm for predicting the missing values with highest probability.

Automatic Discretization

Although in one embodiment, the software can work with continuous variables, it is frequently convenient to discretize them, as this achieves a significant increase in speed with minor or null effects on performance. Several heuristical processes have been implemented that enable the automatic discretization of variables by doing statistical analysis on their data. This analysis is an aid in defining which variables are likely to increase the quality of a model (Bayes Net) if included.

Recycling (Memory Management)

Algorithms are included which increases the efficiency of memory management by recycling. Recycling is a technique by which programming objects which are not used anymore are not left to be garbage-collected but instead are stored in a recycling object which manages memory internally. This process bypasses garbage collection for classes which are frequently instantiated providing significant speed ups over memory management provided by the Java Runtime Environment.

Instance Lists

Instance lists are a database structure that allows enormous space savings over traditional database tables. By converting variables to byte size integers and performing the processing on these, an increase in scalability and speed may be achieved. Moreover, this enables the RAM database and ADTree to perform domain independent processing of the data. As an extension over the basic concept, missing values in variables don't have to be treated as such, which enables the ADTree to cache information about them without any modifications to its structure, this resulting in faster more scalable code.

Instance Trees

Instance trees are an improvement to instance lists that provide dramatic memory need reductions without significantly affecting speed through two different mechanisms:

Smaller record instance lists inside the ADTree (with savings on the order of the number of variables)

Tight coupling within the ADTree. There is no need to maintain the instance tree as a separate structure from the ADTree as this can be modified to accommodate the instance tree as a fully extended branch without zero nor MaxRecord nodes which is precomputed before learning starts.

Potentials

Potentials are conceptually multidimensional arrays. In the software, they are used to represent probability distributions, as well as intermediate results of operations with them. Potentials support at least the basic operations of "normalize", "conditionalize", "sum out", "combine", and "divide by". Two separate implementations of potentials are described below:

Table Potentials

Table potentials are stored as multidimensional arrays. Several accelerator mechanisms are in place that enable performing the above mentioned operations quickly when they are performed repeatedly (as is the frequent case when performing inference). These accelerators are based in caching the internal relations between the dimensions of the array which enable very fast implicit addressing of the arrays involved in the operations. Even faster implementations can be done when the variables in a potential are a subset of the variables in the other. Combine in this situation is called "absorb".

```
* TableCombineAccelerator: An accelerator which is useful for combine
* operations on table potentials. For every entry in the table for the com-
* bined potential, the indexes of the consistent entries in both operands
* (potentials to be combined) are stored. Here is an example, in which a
* table potential over {X, Y, Z} is combined with a table potential over {X,
* Z, M}:
*
*    OPERAND 1                        OPERAND 2
*
*X |0 0 0 0 1 1 1 1|             X |0 0 0 0 1 1 1 1|
*Y |0 0 1 1 0 0 1 1| <-- insts --> Z |0 0 1 1 0 0 1 1|
*Z |0 1 0 1 0 1 0 1|             M |0 1 0 1 0 1 0 1|
*
*   |0 1 2 3 4 5 6 7| <-- index -->  |0 1 2 3 4 5 6 7|
*
*                       UNION
*
*X |0 0 0 0 0 0 0 0 1 1  1  1  1  1  1  1|
*Y |0 0 0 0 1 1 1 1 0 0  0  0  1  1  1  1| <-- union insts
*Z |0 0 1 1 0 0 1 1 0 0  1  1  0  0  1  1|
*M |0 1 0 1 0 1 0 1 0 1  0  1  0  1  0  1|
*
*   |0 1 2 3 4 5 6 7 8 9 10 11 12 13 14 15| <-- index   {X, Y, Z, M}
*
*   |0 0 1 1 2 2 3 3 4 4  5  5  6  6  7  7| <-- cache 1 {X, Y, Z}
*
*   |0 1 2 3 0 1 2 3 4 5  6  7  4  5  6  7| <-- cache 2 {X, Z, M}
*
*Once the accelerator is computed, the time to combine two tables is linear
*in the size of the table of the resulting potential.
*
*<code>TableAbsorbAccelerator</code> An accelerator which is useful for
*ABSORB and SUM_OUT operations on TablePotentials, when it is
*known, a priori, that one of the potentials is a subset of another. For each
*value in the larger set, this accelerator caches an index into the subset's
*data array that holds the value of a consistent instantiation. In the example
*below, the data arrays for sets XYZ and XZ are annotated with their
*instantiations.
*
*
*X |0 0 0 0 1 1 1 1|              X |0 0 1 1|
*Y |0 0 1 1 0 0 1 1| <-- insts --> |       |
*Z |0 1 0 1 0 1 0 1|              Z |0 1 0 1|
*
*   |0 1 2 3 4 5 6 7| <-- index -->  |0 1 2 3|
*
*
*   |0 1 0 1 2 3 2 3| <-- cache
*
*This is what the cache will look like in the above case. While it is true that
*in the worst case the size of the cache is equal to the size of the table of the
*larger set, if the first variable of the subset is different from the first
*variable of the larger set, the cache will have certain periodicity, and hence
*only one period length needs to be cached. In the above case, if the subset
*was {Y, Z} instead of {X, Z}, then only 4 indexes would have required
*caching, as opposed to 8.
```

Entropy Tree Potentials

Tree potentials are an alternate way of storing potentials. They can provide great savings in storage space and increased speed when there exist internal structure within a potential. Intelligent use of mutual information and entropy computations enable the efficient discovery of the internal structure of a potential. These computations are performed very efficiently in cooperation with the ADTree. Entropy Tree potentials also support very efficiently the rest of the potential interface: "normalize", "conditionalize", "sum out", "combine", and "divide by".

In one embodiment, mechanisms for constructing Entropy Tree Potentials provide a flexible mechanism to trade off accuracy in the representation of the internal structure of the potential and size/speed through the usage of a dynamically generated delta threshold based on minimum entropy gain necessary for a variable split.

ADTrees

ADTrees are the Ram DATABASE main cache. ADTrees are a caching structure used to store a database in a way that allows for queries of the type "how many records match a certain pattern". In a basic form, the general concept is in the public domain; the AD Trees of the present invention provide:

Smart inclusion of zero nodes and max record nodes, which provide significant reduction in storage needs thus increasing scalability without significantly affecting speed of access.

Dynamic maintenance of record instance lists pointers in ADNodes which enable for a very fast dynamic growth of the ADTree. This enables ADTrees that are not necessarily precomputed to grow on demand efficiently. This provides great savings in speed and space as only parts of the ADTree that are needed are actually computed.

Dynamic pruning which intelligently prunes less frequently used branches when the system is low in memory, thus dramatically increasing the scalability of the system. The pruning mechanism uses heuristics to select which elements should be pruned, thus record instance lists that enable fast dynamic growth, and ADNodes which provide caching for queries are treated separately thus enabling the pruning mechanism to balance the space devoted to caching answers to previous queries and caching expansion information needed to grow the ADTree when never seen before queries arise.

Smart query processing by which many similar queries are processed simultaneously in a very efficient manner by optimized tree traversal. The integration of this mechanism with potentials enables very fast learning of potentials.

Integration with Entropy Tree potentials which enables the very efficient construction of Entropy Trees without needs for ever expanding the full potentials.

Distributed ADTrees which run in parallel in multiple processors dramatically increase the speed and scalability of the cache Cycle Detection Algorithm Bayes Nets cannot have cycles in them (e.g. the probability of A given B given C given A). Many other data structures also require that they not contain cycles. Typical methods of determining cycicity require checking every node in the graph. In the present invention, methods are able to avoid this and limit testing to a small subset of nodes. The result is that this test is significantly faster in our implementation than the brute force approaches. The present invention extends the well known coloring cycle detection algorithm substantially by providing functionality for efficient detection of cycles when arrows ("adds") are successively added or deleted from the graph.

Parameter Learning

Along with creating a structural model, in the present invention, correlation statistics are provided between nodes and use these as predictive probabilities. The parameter learning techniques determine what these values should be based upon past data and prospective structural models.

Structural Learning

Structural learning is the process of determining a good Bayes Net from a data set. In the present invention, this process requires to principal components:

A structural search algorithm which uses specific graphic operators such as "add arc", "reverse arc", "delete arc", or "expand arc" to modify a current Bayes Net or create one or more new ones, and An evaluation algorithm that provides a score for a Bayes Net.

Structural Search

The present invention uses several structural search algorithms, among which:

Expansion search

Two pass greedy with dynamic arc evaluation and initial random shuffling.

Greedy hill climbing (best of add, delete reverse) with random restart and automatic termination criterion.

This is standard hill-climbing search in the space of Bayesian networks. A single candidate network is maintained. At every step, all the possible successors to this single network are evaluated. Possible successors are obtained by applying one of 3 operators: deleting an arc, adding an arc, reversing an arc (the last one is important to deal with ridges in search space). After all possible successors are evaluated, a successor network that has the highest score is chosen, and the operator is applied to the current network. If a (local) maximum is reached, the network is compressed and is stored for future use together with its score. Then a random restart is performed, i.e. a certain number of random changes are applied to a network, and then the greedy search is repeated. If the achieved score is better than the previously saved best network, the best network is replaced and random restart is performed again, otherwise the random restart is counted as unsuccessful. After N unsuccessful restarts the search halts and uncompresses and returns the currently saved best network.

Compression and Expansion of Bayes Nets

A mechanism for compression and expansion of Bayes Nets dramatically reduces memory consumption in the processes that maintain multiple Bayes Nets through the search. This is particularly useful in multiprocessor structural learning.

Distributed Multiprocessor Structural Learning

Distributed multiprocessor structural learning enables the usage of multiple processors to parallelize the process of finding good Bayes Nets. This is an operation that dramatically improves the speed of the system. Parallel structural learning coupled with parallel ADTrees provide a level of speed and scalability.

Evaluation

An evaluation algorithm provides a score for a Bayes Net. Several evaluation algorithms are used, including:

Maximum likelihood and Bayesian evaluation takes advantage of the ADTree to efficiently compute the likelihood of the training data given the current structure. Bayesian evaluation in addition also incorporates prior information on the likelihood of each structure. To prevent overfitting, heuristics are used to efficiently estimate description lengths, which are used taking advantage of the Minimum Description Length (MDL) principle.

MDL score:

$$score = M*sum(MI) - M*sum(entropy) - c[d*log(M)/2*sum(DL) + numArcs*log\ 2(n)]$$

where:

sum( ) means sum over all nodes

MI is the mutual information of a node and its parents entropy is the self entropy of each node and does not change with structure DL is the "description length" of each node and its parents ie.

$[r-1]*s\_1*s\_2 \ldots *s\_j$ where r is the number of values the node can take and $s\_1 \ldots s\_j$ is the number of values for each of the node's j parents.

numArcs is the total number of arcs in the Bnet n is the total number of nodes in the BNet The score is scaled by:

M (numRecords) is the total number of records in the database c (costweight) defaults to 1; weighs the entire cost d (dlweight) defaults to 1; weighs the description length term For all evaluation algorithms, an efficient dynamic stack implementation enables backtracking which permits very fast evaluation of closely related Bayes Nets.

The evaluation session MUST start with a call to startEvaluation to find the score for the entire network. The score is then updated by subsequent changes to the network. The evaluator keeps a stack of the arc changes made to the network. Calling undo( ) reverses the arc changes made to the network, returns the network to its previous state and dears the stack. Calling commit( ) clears the stack, maintaining the arc changes. The default stack size of the stack is MIN_STACK_SIZE, but can be changed in the network. The evaluator does check to see if the stack size is exceeded and increases it if necessary. When startEvaluation is called, the evaluator evaluates the entire network from scratch. Adding or deleting an arc causes a change in score for the child node. Currently the evaluator does not reevaluate every time an arc change occurs. Instead, when evaluate is called the evaluator goes forward through the stack rescoring each "child node" in the stack and keeping track of which stack items have been reevaluated. Thus a subsequent call to evaluate will rescore only the nodes that have changed since the last evaluate. Note that if several changes have been made to the same node to the stack before calling evaluate, eg. add arc from A→B, add arc C→B, node B will get rescored twice—this could be changed if it turns out to be a common occurrence.

Goal based evaluation methods optimize the scoring mechanism based on the particular queries that the user has defined as having high importance (i.e., prediction or classification of particular variables). Goal-based evaluation takes advantage of high performance sequential and parallel inference to achieve its objective. It measures directly the quality of a network so it is a very accurate metric of the quality, but it is slower than other methods.

Smart heuristics are employed for dynamically and automatically switching between evaluation criteria. This enables Data Digest Corporation software to take advantage of the speed of some criteria and the accuracy of others.

Inference

Inference is the process by which given some observations (evidence) and model (Bayes Net) predictions about the values of non-observed variables can be made. Inference is a critical piece of the software by itself as it is core in the creation of classifications, but also as a component in goal based evaluation.

The inference engine of the present invention is based in the concept of Join Tree. In one embodiment, implementation presents significant improvements over the basic concept that significantly increase the speed and scalability. Some of these are:

- Ability to mix potentials of different types in the same tree which enables the heuristic-based dynamic selection of potential types (e.g., trees vs. tables) based on their characteristics. The ability to do this selection enables high speed, high accuracy inference.
- Usage of non-connected components which enable the usage of a join forest and not simply a join tree, which dramatically increases speed on sparse networks.
- Incremental updates of Join Trees as Bayes Net structure is modified.
- Storage of Potential accelerators in sepsets which enable the reusage of much of the computation on successive pieces of evidence, thus providing significant increases on speed when doing inference in many evidence sets.
- Dynamic addition and retraction of evidence.
- Goal-based construction of Join Trees which enables to use queries to define the structure of the join tree used for inference. This provides significant performance increases, especially when all variables queried can be placed in the same clique (which —of course—always occurs is there is only one variable of interest) as message passing only needs occur in one direction.

One embodiment also uses Polynomial Inference extended to be capable of using entropy trees as well as tables in an efficient manner.

User Interface

Visual Representations of Node and Arc Diagrams

Traditional representations of Bayes Nets are simple nodes and arcs. The user interface of the present invention enhances these representations by using the width of arcs, diameters of nodes, and other representations to clearly call out probabilities of relationships and constituent values.

New visualization process are in place that allow the human visualization of large potentials.

Automatic Layout Algorithms

Automatic layout algorithms enable placement of components on the screen which make a much more scalable and usable UI.

Implementations of Node and Arc Diagram Editors for Performance

In one embodiment, because users are allowed to modify the visual model, the present invention is able to speedily redraw nodes and arcs diagrams, etc.

UI Engine

The present invention uses finite automaton driven software engines. The usage of state machines and finite automaton dramatically simplifies the process of creating use cases and customization of the software.

The usage of XML as a standard for coding these state machines enables the customization of the software at the level of core functionality and use cases by non-developers at a late stage which allows for a much more user friendly and versatile software.

Storage Format

XML Format

The present invention uses an XML format for storing Bayes Nets which extends XBN (Cite Microsoft) and allows for the inclusion of other potential types not covered in the standard, such as:

- Entropy Tree potentials;
- Network scores according to different metrics;
- Graphical information that enables to restore user layout;
- Meta information use for the engine that enables to guarantee data integrity by keeping track of the history of the network;
- Parameters used to generate it, which enables reproduction of any process;
- CRC metadata is generated not only about the database, but also about its structure and version. This enables to maintain data integrity across platforms through the process;
- Close integration with inference engine, enabling fast inference on different sets of evidence.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is being claimed:

1. A method comprising:
   dynamically processing a database to eliminate missing values in records, each record to contain a plurality of values;
   preparing a statistical summary of processed data in the database;
   constructing an alternating decision tree ("ADTree") database structure to hold the statistical summary, wherein the ADTree database structure provides dynamic pruning of less frequently used branches when system memory is low;
   searching through possible relationship models to find a high-scoring network; and
   using the high-scoring network to compute a decision for a new case.

2. The method of claim 1, further comprising:
   discretizing continuous variables in the database before preparing the plurality of statistical summaries.

3. The method of claim 1, further comprising:
   modifying a relationship of the high-scoring network.

4. The method of claim 1 wherein the new case consists of values of a subset of fields of a record.

5. The method of claim 1 wherein records in the database represent bank customer transaction records, and the decision is to identify an at-risk customer of the bank.

6. The method of claim 1 wherein the statistical summary is a Bayesian model of correlations between data in records.

7. The method of claim 1 wherein the decision is one of a detection of an illegal financial transaction, a network fault diagnosis, or a prediction of a result of a pharmaceutical compound in an organism.

8. The method of claim 1, further comprising:
aggregating similar database records together; and
computing a frequency of occurrence for each of the aggregated records.

9. The method of claim 8 wherein aggregating comprises:
preparing a plurality of hashes to cluster the database records.

10. The method of claim 1 wherein the database structure comprises correlation statistics between nodes.

11. The method of claim 1, further comprising:
inferring a value of a non-observed variable based on a previous observation and the high-scoring network.

12. The method of claim 1, further comprising:
storing the high-scoring network in an eXtensible Markup Language ("XML") format.

* * * * *